(12) United States Patent
Dean et al.

(10) Patent No.: US 9,163,570 B2
(45) Date of Patent: Oct. 20, 2015

(54) METHOD AND SYSTEM FOR DETERMINING DIESEL ENGINE AIRFLOW IN AN ENGINE USING A LATE INTAKE VALVE CLOSURE STRATEGY

(71) Applicant: GM GLOBAL TECHNOLOGY OPERATIONS LLC, Detroit, MI (US)

(72) Inventors: Charles Dean, Clarkston, MI (US); Michael J. Lucido, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 13/968,741

(22) Filed: Aug. 16, 2013

(65) Prior Publication Data

US 2015/0051810 A1    Feb. 19, 2015

(51) Int. Cl.
*F02D 41/00*    (2006.01)

(52) U.S. Cl.
CPC ...... *F02D 41/0002* (2013.01); *F02D 2041/001* (2013.01); *F02D 2041/0015* (2013.01); *F02D 2200/0406* (2013.01); *F02D 2200/0414* (2013.01)

(58) Field of Classification Search
CPC .............. F02D 41/00; F02D 41/0002; F02D 2041/001; F02D 2200/0406; F02D 2200/0414; F02D 29/02; F01L 1/3442; B60W 10/06
USPC ............... 701/102–105, 109, 110; 123/90.11, 123/90.15, 319, 339.12, 339.16, 339.22, 123/339.24
See application file for complete search history.

(56) References Cited

U.S. PATENT DOCUMENTS

| | | | | |
|---|---|---|---|---|
| 5,094,207 A | * | 3/1992 | Krampe et al. | 123/339.23 |
| 5,490,417 A | * | 2/1996 | Nakajima | 73/114.32 |
| 5,604,306 A | * | 2/1997 | Schricker | 73/114.31 |
| 6,588,397 B1 | * | 7/2003 | Sieber | 123/295 |
| 6,814,060 B1 | * | 11/2004 | Solomons et al. | 123/501 |
| 6,938,598 B1 | * | 9/2005 | Lewis et al. | 123/179.1 |
| 7,461,621 B2 | * | 12/2008 | Ota et al. | 123/179.4 |
| 2005/0205069 A1 | * | 9/2005 | Lewis et al. | 123/491 |
| 2009/0241905 A1 | * | 10/2009 | Tomiita et al. | 123/470 |
| 2009/0249862 A1 | * | 10/2009 | Glover et al. | 73/30.04 |

* cited by examiner

*Primary Examiner* — John Kwon
*Assistant Examiner* — Johnny H Hoang
(74) *Attorney, Agent, or Firm* — Quinn Law Group, PLC

(57) ABSTRACT

A method can determine diesel engine airflow in a diesel internal combustion engine using a late intake valve closure (LIVC) strategy. The method includes monitoring the air temperature in an intake manifold to determine an intake manifold air temperature; monitoring a coolant temperature; and determining the air temperature in an intake port of a diesel internal combustion engine. The method includes monitoring the air pressure in the intake manifold and monitoring the engine speed of the diesel internal combustion engine. Moreover, the method includes determining the air density in the diesel internal combustion engine and determining a diesel engine airflow; and determining an intake valve closure crank angle. The method additionally includes determining an adjusted diesel engine airflow based on the diesel engine airflow, engine speed, and intake valve closure crank angle.

20 Claims, 2 Drawing Sheets

METHOD AND SYSTEM FOR DETERMINING DIESEL ENGINE AIRFLOW IN AN ENGINE USING A LATE INTAKE VALVE CLOSURE STRATEGY

TECHNICAL FIELD

The present disclosure relates to a method and system for determining diesel engine airflow in a diesel internal combustion engine using a late intake valve closure (LIVC) strategy.

BACKGROUND

Some vehicles include a diesel internal combustion engine for propulsion. During operation, the diesel internal combustion engine ignites an air/fuel mixture to rotate a crankshaft. Accordingly, the diesel internal combustion engine receives intake air from an intake manifold. Because the intake air is an important part of the combustion process in a diesel internal combustion engine, it is useful to examine the diesel engine airflow. As used herein, the term "diesel engine airflow" means the flow of gases (e.g. air) entering a combustion chamber of a diesel internal combustion engine. The diesel engine airflow may be examined, for example, as a part of a diagnosis procedure. Examining the diesel engine airflow may also be useful to control exhaust gas recirculation (EGR) flow. It is therefore useful to determine the diesel engine airflow irrespective of the intake valve closure strategy employed by the diesel internal combustion engine.

SUMMARY

The present disclosure relates to a method and system for determining an adjusted diesel engine airflow in a diesel internal combustion engine using a late intake valve closure (LIVC) strategy. In this disclosure, the term "late intake valve closure strategy" means an operation of a diesel internal combustion engine, wherein an intake valve opens when a piston is at about its top dead center (TDC) and closes at or after the piston reaches the bottom dead center (BDC) of a compression stroke. The term "adjusted diesel engine airflow" means the flow of gases (e.g., air) entering a combustion chamber of a diesel internal combustion engine via the intake port when the diesel internal combustion engine employs the LIVC strategy. When a diesel internal combustion engine employs the LIVC strategy, gases in the combustion chamber may be forced back into the intake manifold via the intake port while the intake valve is opened. As a result, the air temperature in the intake port may increase. Such air temperature increase may affect the way the diesel engine airflow is determined. It is therefore desirable to develop a method and system capable of determining an adjusted diesel engine airflow that takes into account the use of the LIVC in a diesel internal combustion engine.

As mentioned above, this disclosure relates a method for determining diesel engine airflow in a diesel internal combustion engine. In an embodiment, the method includes monitoring the air temperature in an intake manifold to determine an intake manifold air temperature; monitoring a coolant temperature; and determining the air temperature in an intake port of a diesel internal combustion engine. The air temperature in the intake port is based on the air temperature in the intake manifold and the coolant temperature. The intake port is in fluid communication with the intake manifold. The method further includes monitoring the air pressure in the intake manifold and monitoring the engine speed of the diesel internal combustion engine. Moreover, the method includes determining the air density in the diesel internal combustion engine based on the air pressure in the intake manifold and the air temperature in the intake port. Further, the method includes determining the diesel engine airflow based on the air density and engine speed. Additionally, the method includes determining an intake valve closure timing with respect to a crankshaft position of the diesel internal combustion engine in order to determine an intake valve closure crank angle. The term "intake valve closure crank angle" means the timing of the intake valve closure with respect to the crankshaft rotational position as measured in angles. The intake valve closure occurs after a piston reaches a bottom dead center of a compression stroke. The method additionally includes determining an adjusted diesel engine airflow based on the diesel engine airflow, engine speed, and intake valve closure crank angle.

This disclosure also relates to a system for determining an adjusted diesel engine airflow in a diesel internal combustion engine using a LIVC strategy. The system includes a diesel internal combustion engine defining an intake port, an exhaust port, and a cylinder in fluid communication with the intake port and the exhaust port. The system further includes an intake manifold in fluid communication with the intake port. Further, the system includes a control module in communication with the diesel internal combustion engine. The control module can perform the following functions: monitor the air temperature in an intake manifold to determine an intake manifold air temperature, and monitor a coolant temperature. The control module can also determine the air temperature in an intake port of the diesel internal combustion engine. The air temperature in the intake port is based on the air temperature in the intake manifold and the coolant temperature. The control module is configured to monitor the air pressure in the intake manifold, monitor the engine speed of the diesel internal combustion engine, and determine the air density in the diesel internal combustion engine. The air density in the internal combustion engine is based on the air pressure in the intake manifold and the air temperature in the intake port. The control module can also determine the diesel engine airflow based on the air density and engine speed. Additionally, the control module can determine an intake valve closure timing with respect to a crankshaft position of the diesel internal combustion engine in order to determine an intake valve closure crank angle. The intake valve closure occurs after the piston reaches a bottom dead center of a compression stroke. The control module is also configured to determine an adjusted diesel engine airflow based on the diesel engine airflow, engine speed, and intake valve closure crank angle.

The above features and advantages, and other features and advantages of the present invention are readily apparent from the following detailed description of some of the best modes and other embodiments for carrying out the invention, as defined in the appended claims, when taken in connection with the accompanying drawings.

DETAILED DESCRIPTION

Figure 1:
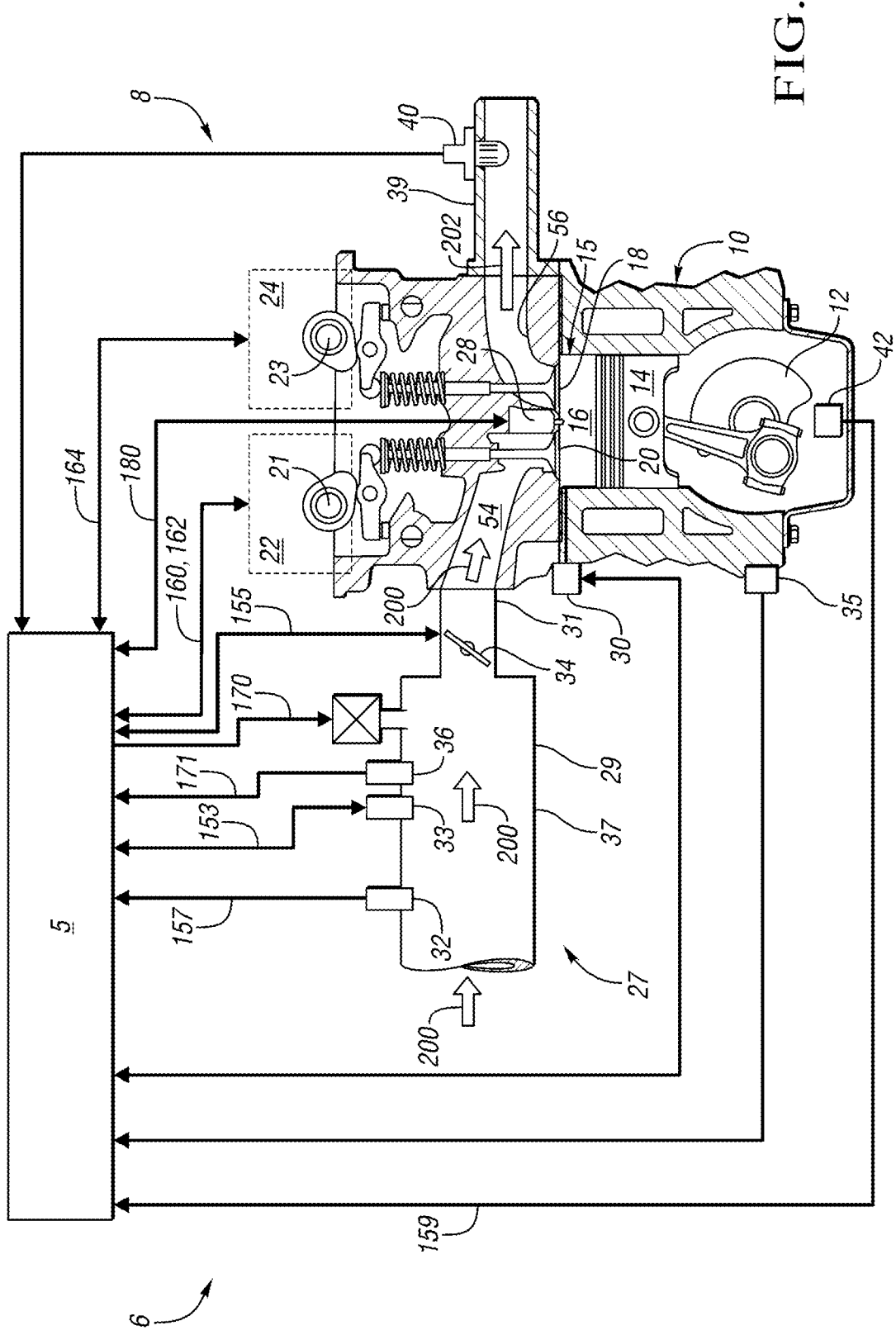
FIG. 1 is a schematic, sectional view of an engine assembly including an intake manifold, a diesel internal combustion engine, and a control module.

Referring to the drawings, wherein like reference numbers refer to like components, FIG. 1 includes a section view of a diesel internal combustion engine 10 and a schematic of an accompanying control module 5 that have been constructed in accordance with an embodiment of this disclosure. The diesel internal combustion engine 10 may be part of an engine system 8. The engine system 8 may be referred to as "a system" and includes an air intake system 27 in fluid communication with the diesel internal combustion engine 10. The engine system 8 may be part of a vehicle 6.

The diesel internal combustion engine 10 is a compression-ignition engine and includes one or more reciprocating pistons 14 slidably movably disposed in cylinders 15. The cylinders 15 and the pistons 14 jointly define variable volume combustion chambers 16. Each piston 14 is connected to a rotating crankshaft 12 by which linear reciprocating motion is translated to rotational motion.

The air intake system 27 includes an intake air manifold 29 capable of receiving intake air 200 from the outside atmosphere. The intake manifold 29 can direct and distribute the intake air 200 into the combustion chambers 16. The intake manifold 29 includes a plenum 37 and one or more intake conduits 31 such as runners. The plenum 37 can direct intake air 200 toward the intake conduits 31. In turn, the intake conduits 31 can direct the intake air 200 toward the combustion chambers 16 of the diesel internal combustion engine 10. The air intake system 27 includes one or more intake conduits 31 for directing intake air 200 to the diesel internal combustion engine 10 and a temperature sensor 32 for monitoring the intake air temperature. Specifically, the temperature sensor 32 can measure the temperature of the intake air 200 entering the intake manifold 29 or already inside the intake manifold 29. For instance, the temperature sensor 32 may measure air temperature of the intake air 200 inside the plenum 37 or in another part of the intake manifold 29. Regardless, the temperature sensor 32 is in electronic communication with to the control module 5 and can send a signal indicative of the air temperature (i.e., the temperature signal 157) to the control module 5.

In addition to the temperature sensor 32, the air intake system 27 may include a swirl valve 34 inside the intake conduit 31 of the intake manifold 29. The swirl valve 34 is in communication with the control module 5. The swirl valve 34 may be rotatably coupled inside the intake conduit 31 to control the swirl motion of the intake air 200 entering the combustion chamber 16. The control module 5 may send a swirl control signal 155 to move the swirl valve 34 inside the intake conduit 31. In response, the swirl valve 34 can rotate inside the intake conduit 31 to control the swirl motion of the intake air 200 entering the combustion chamber 16. Because the control module 5 controls the movement of the swirl valve 34, it can also monitor the position of the swirl valve 34 inside the intake conduit 31.

The air intake system 27 additionally includes a pressure sensor 36 in the intake manifold 29. The pressure sensor 36 can measure the air pressure inside the intake manifold 29. For instance, the pressure sensor 36 can measure the air pressure inside the plenum 37 or in another part of the intake manifold 29. The control module 5 is electronic communication with the pressure sensor 36 and can therefore receive a signal indicative of the air pressure in the intake manifold 29 (i.e., air pressure signal 171) from the pressure sensor 36.

The air intake system 27 further includes a mass air flow (MAF) sensor 33 in the intake manifold 29. The MAF sensor can measure the airflow of the intake air 200 entering the diesel internal combustion engine 10. The control module 5 is in electronic communication with the MAF sensor 33 and can therefore receive a signal indicative of the airflow of the intake air 200 entering the diesel internal combustion engine 10 (i.e., the mass flowrate signal 153) from the MAF sensor 33.

The air intake system 27 may recirculate exhaust gases from an exhaust manifold 39 to the intake manifold 29 via an external flow passage (not shown). An exhaust gas recirculation (EGR) valve 38 may control the flow of exhaust gases into the intake manifold 29. The control module 5 is electronically coupled to the EGR valve 38 and can thus regulate the flow of exhaust gases to the intake manifold 29 by controlling the EGR valve 38 through an EGR control signal 170.

The diesel internal combustion engine 10 may include an intake port 54 in direct fluid communication with the intake manifold 29 and one of the cylinders 15. Accordingly, the intake air 200 can flow from the intake manifold 29 to the diesel internal combustion engine 10 via the intake port 54. The intake port 54 fluidly couples the intake manifold 29 to the combustion chamber 16. The diesel internal combustion engine 10 further includes one or more intake valves 20 for controlling the flow of intake air 200 into the combustion chamber 16. The intake valve 20 is movably disposed in the intake port 54 and can therefore move between an open position and a closed position. In the open position, the intake valve 20 allows the intake air 200 in the intake port 54 to flow to the combustion chamber 16. In the closed position, the intake valve 54 precludes, or at least inhibits, the intake air 200 from flowing into the combustion chamber 16.

The diesel internal combustion engine 10 additionally includes one or more exhaust ports 56 fluidly interconnecting the combustion chamber 16 and the exhaust manifold 39. Hence, one of the exhaust ports 56 may be in fluid communication with one of the cylinders 15. During operation of the diesel internal combustion engine 10, exhaust gases 202 exit the combustion chamber 16 via the exhaust port 56. The diesel internal combustion engine 10 further includes one or more exhaust valves 18 for controlling the flow of exhaust gases 202 out of the combustion chamber 16.

The diesel internal combustion engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam duration (VLD) devices 22 and 24, respectively. The intake and exhaust VLD devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20, 18 to the positions of the crankshaft 12 and the pistons 14.

The intake VLD device 22 may include a mechanism operative to switch and control the valve lift profile of one or more of the intake valve(s) 20 in response to a lift control signal 160 from the control module 5. Further, the VLD device 22 can include a mechanism operative to control the duration of the valve lift (VLD) of the intake valve 20 for each cylinder 15 in response to a control signal 162 from the control module 5. The exhaust VLD device 24 may include a mechanism operative to variably control the duration of the valve lift (i.e., VLD) of the exhaust valve(s) 18 in response to valve control signals 164 from the control module 5.

Aside from the VLD devices 22 and 24, the engine system 8 includes one or more fuel injectors 28 each configured to directly inject fuel into the combustion chambers 16. The fuel injectors 28 can inject fuel into the combustion chambers 16 in response to a control signal 180 from the control module 5.

The fuel injectors 28 are supplied with pressurized fuel from a fuel distribution system (not shown).

In addition to the fuel injectors 28, the engine system 8 includes a crank sensor 42 configured to monitor crankshaft rotational position and crankshaft rotational speed. The crankshaft rotational position may be referred to as a "crank angle," and the crankshaft rotational speed may be referred to as "engine speed." Accordingly, the crank sensor 42 is configured to determine and monitor crank angle and engine speed.

The engine system 8 further includes a combustion sensor 30 configured to monitor combustion in the diesel internal combustion engine 10. The combustion sensor 30 may be a cylinder pressure sensor configured to monitor in-cylinder combustion pressure. Moreover, the engine system 8 may include an exhaust gas sensor 40, such as an air/fuel ratio sensor, configured to monitor exhaust gases. The output of the combustion sensor 30 and the crank sensor 42 are monitored by the control module 5 to determine combustion phasing, i.e., timing of combustion pressure relative to the crank angle of the crankshaft 12 for each cylinder 15 in each combustion cycle. The combustion sensor 30 can also be monitored by the control module 5 to determine the engine load in terms of indicated mean effective pressure (IMEP) for each cylinder 15 in each combustion cycle. The diesel internal combustion engine 10 and control module 5 are configured to monitor and determine the engine load (e.g., IMEP) for each of the engine cylinders 15 in each combustion cycle.

The diesel internal combustion engine 10 may also include a coolant sensor 35 for monitoring the coolant temperature. The coolant sensor 35 can send a signal indicative of the coolant temperature (i.e., the coolant signal 159) to the control module 5.

The control module 5 may be an engine control module (ECM). As used herein, the terms "control module," "module," "controller," "processor" and similar terms mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms may be executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event. In operation, the control module 5 monitors inputs from the aforementioned sensors. For example, the control module 5 can monitor the sensors indicating the engine speed, intake air temperature, and coolant temperature as discussed above.

The diesel internal combustion engine 10 may operate using a late intake valve (LIVC) strategy. In a LIVC strategy, the intake valve 20 is opened when the piston 14 is at about the top dead center (TDC) of the piston 14 and closes at or after the piston 14 reaches the bottom dead center (BDC) of a compression stroke. The TDC is the position of the piston 14 in which it is farthest from the crankshaft 12, while the BDC is the position of the piston 14 in which it is nearest the crankshaft 12. As a non-limiting example, in a LIVC strategy, the closing timing of the intake valve 20 may range between 51 and 111 crank angle degrees after the piston 14 reaches the BDC. The term "crank angle" refers to the rotational position of the crankshaft 12.

When the diesel internal combustion engine 10 employs the LIVC strategy, the amount of air that can be trapped in the cylinder 15 is reduced, thereby changing the effective compression ratio and lowering the peak compression pressure in the cylinder 15. In addition, when the diesel internal combustion engine 10 employs the LIVC strategy, gases in the combustion chamber 16, which may include air and fuel, may be forced back into the intake manifold 29 via the intake port 54 while the intake valve 20 is opened. As a result, the air temperature in the intake port 54 may increase. Such air temperature increase may affect the way the diesel engine airflow is determined. It is nevertheless important to accurately determine the flow of the intake air 200 entering the combustion chamber 16 (i.e., the diesel engine airflow). As discussed above, the diesel engine airflow may be used for engine diagnosis purposes. Further, the diesel engine airflow may be used to control EGR systems.

Figure 2:
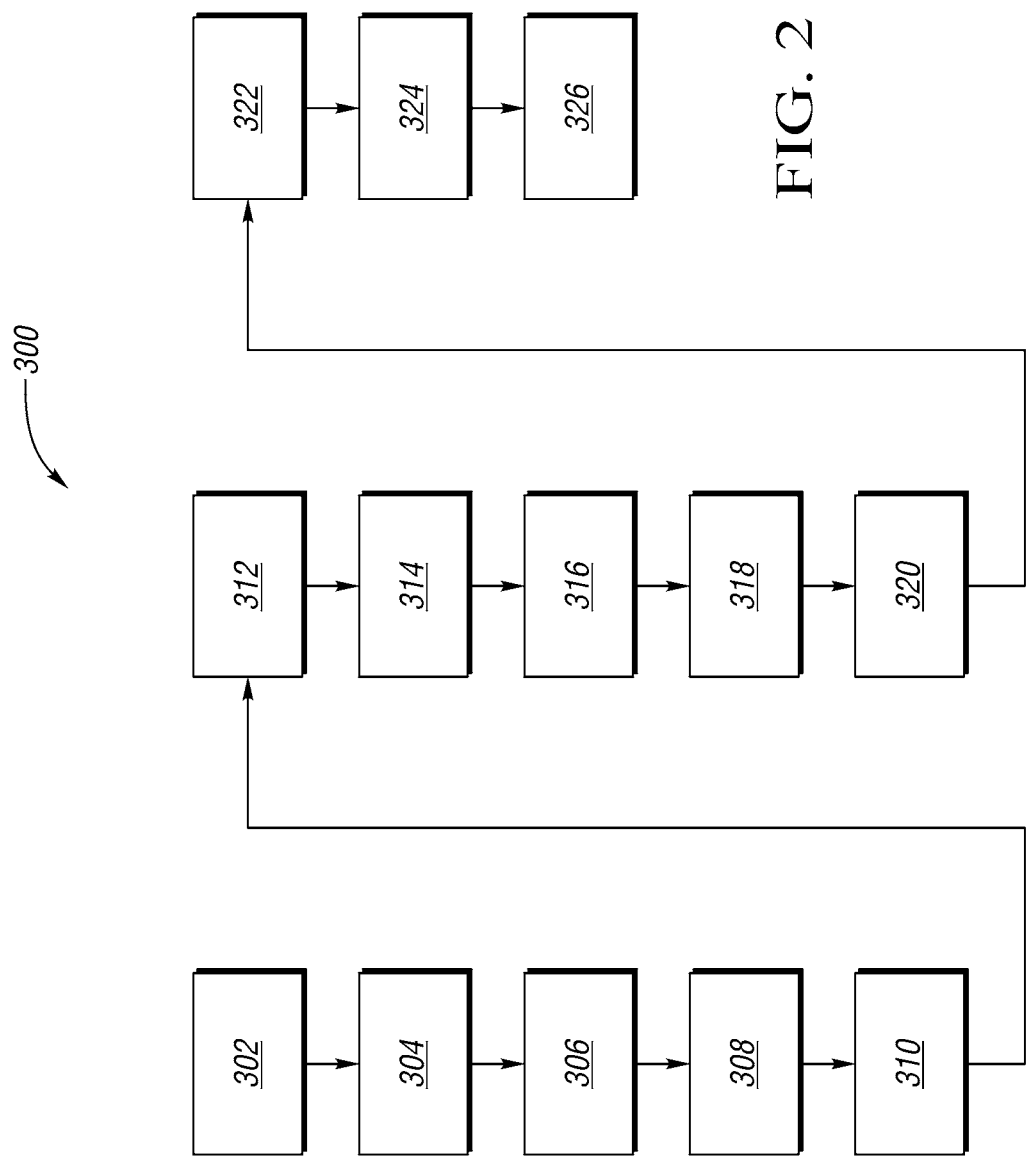
FIG. 2 is a flowchart illustrating a method of determining diesel engine airflow.

FIG. 2 illustrates a flowchart of a method 300 for determining diesel engine airflow in the diesel internal combustion engine 10 while the engine 10 employs a continuous LIVC strategy. In an embodiment, the method 300 begins at step 302. Step 302 entails monitoring the air temperature in the intake manifold 29 (i.e., the intake manifold air temperature). Specifically, the temperature sensor 32 continuously monitors the temperature of the intake air 200 inside the intake manifold 29 and sends a signal (i.e., the temperature signal 157) to the control module 5. The control module 5 then receives the temperature signal 157 from the temperature sensor 32 and stores the information associated with the temperature signal 157. The temperature sensor 32 may measure the air temperature in the intake conduit 31 but outside the intake port 54. The method 300 then proceeds to step 304.

Step 304 entails monitoring a coolant temperature. As discussed above, the coolant sensor 35 can measure the coolant temperature and sends a signal indicative of the coolant temperature (i.e., the coolant signal 159) to the control module 5. The control module 5 reads the coolant signal 159 and stores the information associated with the coolant signal 159. Next, the method 300 continues to step 306.

Step 306 entails determining the air temperature in the intake port 54 based on the air temperature determined in step 302 and the coolant temperature determined in step 304. It is important to determine the temperature of the intake air 200 in the intake port 54 to properly estimate airflow in the intake port 54. To do so, the coolant temperature should be considered. Therefore, the air temperature in the intake port 54 is a function of the air temperature in the intake manifold 29 (i.e., the measured intake temperature) and the coolant temperature. The air temperature in the intake port 54 may be obtained from data sets stored in a table form within data structures in the control module 5. Such data sets are provided for reference by the routine in pre-stored table format indexed by the air temperature in the intake manifold 29 and coolant temperature. These data sets can be empirically derived from simulation or testing of the diesel internal combustion engine 10 at different air temperatures in the intake manifold 29 and coolant temperatures at various engine conditions. The air pressure in the intake port 54 may also be referred to as the corrected manifold temperature. Once the air temperature in the intake port 54 has been determined, the method continues to step 308.

Step 308 entails monitoring the air pressure in the intake manifold 29. As discussed above, the pressure sensor 36 can measure the pressure of the intake air 200 in the intake manifold 29 and generate a signal indicative of the air pressure (i.e., pressure signal 171). The pressure sensor 36 can send the pressure signal 171 to the control module 5. The control module 5 can receive the pressure signal 171 and can store the information associated with the pressure signal 171. As discussed above, the pressure sensor 36 can monitor the air pressure inside the intake manifold 29 (i.e., outside the intake port 54). It is nonetheless important to determine the pressure of the intake air 200 in the intake port 54 to properly estimate the airflow entering the combustion chamber 16. After monitoring the air pressure in the intake manifold 29, the method 300 continues to step 310.

Step 310 entails monitoring the engine speed of the diesel internal combustion engine 10. As discussed above, the engine speed may be determined based on input signals from the crank sensor 42. Thus, the crank sensor 42 sends a signal to the control module 5 indicative of the engine speed. In response, the control module 5 reads this signal and stores the information associated with this signal (i.e., engine speed). Then, the method 300 proceeds to step 312.

Step 312 entails determining or monitoring the engine load of the diesel internal combustion engine 10. The engine load may be determined, for example, in terms of engine torque, fuel consumption, indicated mean effective pressure (IMEP), or brake mean effective pressure (BMEP), among others. The control module 5 may derive the engine torque based on input provided by the combustion sensor 30 or other inputs such as brake power. After obtaining the engine speed in step 310 and the engine load in step 312, the method 300 continues to step 314.

Step 314 entails determining an engine load correction factor based on the engine speed determined in step 310 and the engine load determined in step 312. The engine load correction factor may be obtained from data sets stored in a table form within data structures in the control module 5. Such data sets are provided for reference by the routine in pre-stored table format indexed by the engine load and engine speed. These data sets are empirically derived from simulation or testing the diesel internal combustion engine 10 at different engine speeds. For example, the data sets of the engine load correction may include data corresponding to the following engine speeds: 1000, 1500, and 2000 RPMs. The control module 5 may interpolate or extrapolate the data sets to obtain any necessary engine load correction factor. The method 300 continues to step 316 after determining the engine load correction factor.

In step 316, the engine load correction factor is used to correct the measured air temperature in the intake manifold 29 as determined in step 302, thereby determining a corrected air temperature. The term "corrected air temperature" means the air temperature in the intake manifold 29 that takes into account heat transfer to/from the gas occurring along the distance between the temperature sensor 32 and the combustion chamber 16 in the diesel internal combustion engine 10. As discussed above, when the diesel internal combustion engine 10 employs the LIVC strategy, gases in the combustion chamber 16 may be forced back into the intake manifold 29 via the intake port 54 while the intake valve 20 is opened. As a result, the air temperature in the intake port 54 may increase. It is understood that the engine load correction factor is not specific to LIVC usage, although it can be more pronounced with LIVC. Even with base intake timing, the engine load will affect the heat transfer to the gas before it enters the combustion chamber 16. This is due to elevated material temperatures (higher intake valve temperature) and slight amounts of reverse flow from the cylinder 15 to the intake port 54. The temperature of the intake air 200 in the intake port 54 and the temperature of any gas that flows from the cylinder 15 back into the intake manifold 29 are affected by the engine load due to heat transfer. Thus, the engine load correction factor can be applied to the air temperature in the intake manifold 29 as determined in step 302 (i.e., the measured intake manifold temperature) to determine the air density of the intake air 200 (or gases) entering the combustion chamber 16. Thus, the step 316 entails determining the air density of the intake air 200 at the intake port 54 based on the air pressure in the intake manifold 29 determined in step 308, the air temperature in the intake port 54 determined in step 306, and the engine load correction factor determined in step 314. Hence, the air density of the intake air 200 (or gases) entering the combusting chamber 16 is a function of the air pressure in the intake manifold 29 obtained in step 308, the air temperature in the intake port 54 determined in step 306, and the engine load correction factor determined in step 314. The control module 5 may also calculate the air density using the ideal gas equation. Alternatively, the air density may be obtained from data sets stored in a table form within data structures in the control module 5. Such data sets are provided for reference by the routine in pre-stored table format indexed by measured air pressure and air temperature (as modified by applying the engine load correction factor). These data sets can be empirically derived from simulation or testing the diesel internal combustion engine 10 at different engine speeds. For example, the data sets of the engine load correction may include data corresponding to the following engine speeds: 1000, 1500, and 2000 RPMs. The control module 5 may interpolate or extrapolate the data sets to obtain any necessary air density. After determining the air density of the intake air 200 in the intake port 54, the method 300 continues to step 318.

Step 318 entails determining the diesel engine airflow, which is the airflow entering the combustion chamber 16. The diesel engine airflow is a function of the air density in the intake port 54 determined in step 316 and the engine speed determined in step 310. Specifically, the diesel engine airflow may be obtained from data sets stored in a table form within data structures in the control module 5. Such data sets are provided for reference by the routine in pre-stored table format indexed by air density and engine speed. These data sets can be empirically derived from simulation or testing the diesel internal combustion engine 10 at different engine speeds. For example, the data sets of the air density may include data corresponding to the following engine speeds: 1000, 1500, and 2000 RPMs. The control module 5 may interpolate or extrapolate the data sets to obtain any necessary diesel engine airflow. After determining the determining the diesel engine airflow in step 318, the method continues to step 320.

Step 320 entails monitoring the position of the swirl valve 34 (i.e., the swirl valve position). As discussed above, the control module 5 may control the position of the swirl valve 34. Consequently, the control module 5 may monitor the swirl valve position. After determining the swirl valve position, the method 300 proceeds to step 322.

Step 322 entails determining an intake valve closure timing with respect to the crankshaft position in order to determine an intake valve closure crank angle. The term "intake valve closure crank angle" means the timing of the intake valve closure with respect to the crankshaft rotational position as measured in angles. In other words, the intake valve closure timing can be measured in terms of the crankshaft rotational position as measured in crank angles. Since the control module 5 regulates the intake valve closure timing, the intake valve closure timing may be obtained directly from the control module 5. Because the diesel internal combustion engine 10 employs a LIVC strategy, the intake valve closure occurs at or after the piston 14 reaches the BDC of the compression stroke. The control module 5 can be configured to regulate the intake valve 20 such that the intake valve 20 closes after the piston 14 reaches the BDC of the compression stroke. Then, the method 300 continues to step 324.

Step 324 entails determining a diesel engine airflow correction factor based on the intake closure crank angle determined in step 318, the swirl valve position determined in step 322, and the engine speed determined in step 310. The term "diesel engine airflow correction factor" means a factor that can be applied to the diesel engine airflow determined in step 318 (as discussed below with respect to step 326) in order to determine a diesel engine airflow value that takes into account the LICV strategy. The diesel engine airflow correction factor is a function of the intake closure crank angle determined in step 318, the swirl valve position determined in step 322, and the engine speed determined in step 310. Specifically, the diesel engine airflow correction factor may be obtained from data sets stored in a table form within data structures in the control module 5. Such data sets are provided for reference by the routine in pre-stored table format indexed by swirl valve position and intake valve closure timing (in term of crank angles). These data sets can be empirically derived from simulation or testing the diesel internal combustion engine 10 at different engine speeds. The control module 5 may include several tables for different engine speeds. For example, the data sets of the airflow correction factor may include data corresponding to the following engine speeds: 1000, 1500, and 2000 RPMs. The control module 5 may interpolate or extrapolate the data sets to obtain any necessary airflow correction factor. The method 300 then continues to step 326.

Step 326 entails determining a final or adjusted diesel engine airflow of the intake air 200 entering the combustion chamber 16 when the diesel internal combustion engine 10 employs the LIVC strategy. The term "adjusted diesel engine airflow" means the flow of gases entering the combustion chamber 16 of the diesel internal combustion engine 10 via the intake port 54 when the diesel internal combustion engine 10 employs the LIVC strategy. The adjusted diesel engine airflow is based on the airflow correction factor determined in step 324 and the diesel engine airflow determined in step 318. Because the diesel engine airflow correction factor is based on the intake closure crank angle determined in step 318 and swirl valve position determined in step 322, the adjusted diesel engine airflow is also based on the diesel engine airflow determined in step 318, engine speed, intake valve closure timing (i.e., crank angle), and swirl valve position. In step 326, the adjusted diesel engine airflow of the intake air 200 (or gases) entering the combustion chamber 16 may be determined by applying the diesel engine airflow correction factor to the diesel engine airflow determined in step 318.

The adjusted diesel engine airflow determined in step 326 may be used for different diagnosis purposes. For example, the adjusted diesel engine airflow determined in step 326 may be compared to the airflow measured by the MAF sensor 33. The difference between the adjusted diesel engine airflow determine in step 326 and the airflow measured by the MAF sensor 33 may be used to determine if the MAF sensor 33 is not operating properly. In another example, when EGR control is active, the adjusted diesel engine airflow determined in step 326 can be compared to measured airflow from the MAF sensor 33 in order to estimate EGR flow rate. Also, when EGR control is active, the adjusted diesel engine airflow determined in step 326 can be compared to measured airflow from the MAF sensor 33 in order to diagnose a damaged EGR system (such as EGR valve stuck closed or EGR cooler plugged). The adjusted diesel engine airflow determined in step 326 can be compared to measured airflow from the MAF sensor 33 to diagnose insufficient airflow due to a pressure leak or EGR valve stuck open.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for determining an adjusted diesel engine airflow in a diesel internal combustion engine using a late intake valve closure (LIVC) strategy, the method comprising:
   monitoring air temperature in an intake manifold to determine an intake manifold air temperature;
   monitoring a coolant temperature;
   determining an air temperature in an intake port of the diesel internal combustion engine, wherein the intake port is in fluid communication with the intake manifold, and the air temperature in the intake port is based on the intake manifold air temperature and the coolant temperature;
   monitoring an air pressure in the intake manifold;
   monitoring an engine speed of the diesel internal combustion engine;
   determining an air density in the diesel internal combustion engine based on the air pressure in the intake manifold and the air temperature in the intake port;
   determining a diesel engine airflow based on the air density and the engine speed;
   determining an intake valve closure timing with respect to a crankshaft position of the diesel internal combustion engine in order to determine an intake valve closure crank angle, wherein an intake valve closure occurs after a piston of the diesel internal combustion engine reaches a bottom dead center of a compression stroke; and
   determining the adjusted diesel engine airflow based on the diesel engine airflow, the engine speed, and the intake valve closure crank angle.

2. The method of claim 1, further comprising monitoring a swirl valve position of a swirl valve in an intake manifold conduit that is in fluid communication with the intake port.

3. The method of claim 2, wherein determining the corrected diesel engine air flow is also based on the swirl valve position.

4. The method of claim 1, further comprising determining an engine load of the diesel internal combustion engine.

5. The method of claim 4, further comprising determining an engine load correction factor based on the engine load and the engine speed.

6. The method of claim 5, further comprising determining a corrected air temperature based on the engine load correction factor and the air temperature in the intake port.

7. The method of claim 6, wherein determining the air density is based on the corrected air temperature and the air pressure.

8. A system, comprising:

a diesel internal combustion engine defining an intake port, an exhaust port, and a cylinder in fluid communication with the intake port and the exhaust port, the diesel internal combustion engine including a piston movably disposed in the cylinder and an intake valve movably disposed in the intake port;

an intake manifold in fluid communication with the intake port; and a control module in communication with the diesel internal combustion engine, the control module being configured to:

monitor an air temperature in an intake manifold to determine an intake manifold air temperature;

monitor a coolant temperature;

determine an air temperature in the intake port, wherein the air temperature in the intake port is based on the intake manifold air temperature and the coolant temperature;

monitor air pressure in the intake manifold;

monitor an engine speed of the diesel internal combustion engine;

determine an air density in the diesel internal combustion engine based on the air pressure in the intake manifold and the air temperature in the intake port;

determine a diesel engine airflow based on the air density and the engine speed;

determine an intake valve closure timing with respect to a crankshaft position of the diesel internal combustion engine in order to determine an intake valve closure crank angle, wherein an intake valve closure occurs after the piston of the diesel internal combustion engine reaches a bottom dead center of a compression stroke; and determine an adjusted diesel engine airflow based on the diesel engine airflow, the engine speed, and the intake valve closure crank angle.

9. The system of claim 8, further comprising a swirl valve in the intake manifold, wherein the control module is configured to monitor a swirl valve position of the swirl valve.

10. The system of claim 9, wherein the corrected diesel engine air flow is based in part on the swirl valve position.

11. The system of claim 8, wherein the control module is configured to determine an engine load of the diesel internal combustion engine.

12. The system of claim 11, wherein the control module is configured to determine an engine load correction factor based on the engine load and the engine speed.

13. The system of claim 12, wherein the control module is configured to determine a corrected air temperature based on the engine load correction factor and the air temperature in the intake port.

14. The system of claim 13, wherein the control module is configured to determine the air density is based in part on the corrected air temperature and the air pressure.

15. The system of claim 8, further comprising a temperature sensor electronically coupled to the control module, wherein the temperature sensor is configured to measure the intake manifold air temperature.

16. The system of claim 8, further comprising a pressure sensor electronically coupled to the control module, wherein the pressure sensor is configured to measure the air pressure in the intake manifold.

17. The system of claim 8, wherein the diesel internal combustion engine further includes a crank sensor electronically coupled to the control module, the crank sensor being configured to measure the engine speed.

18. The system of claim 8, further comprising a combustion sensor electronically coupled to the control module, the combustion sensor being configured to monitor the engine load.

19. The system of claim 8, wherein the control module is configured to regulate the intake valve such that the intake valve closes after the piston reaches the bottom dead center of the compression stroke.

20. The system of claim 8, further comprising a coolant sensor electronically coupled to the control module, wherein the coolant sensor is configured to measure the coolant temperature.

* * * * *